Feb. 2, 1937.  A. A. THOMAS  2,069,632
OPTICAL SOUND REPRODUCING APPARATUS
Filed March 3, 1931   3 Sheets-Sheet 1
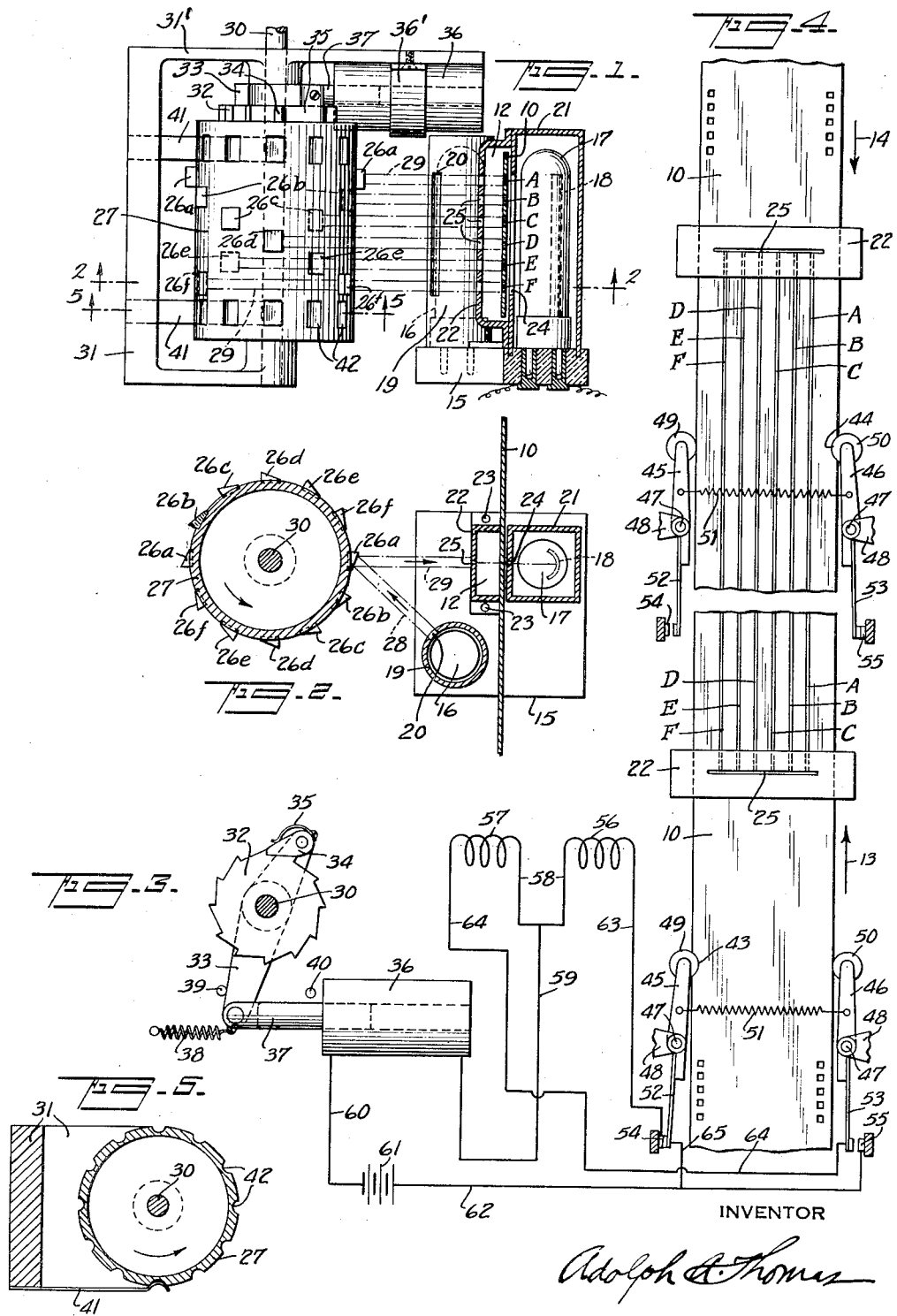
INVENTOR
Adolph A. Thomas

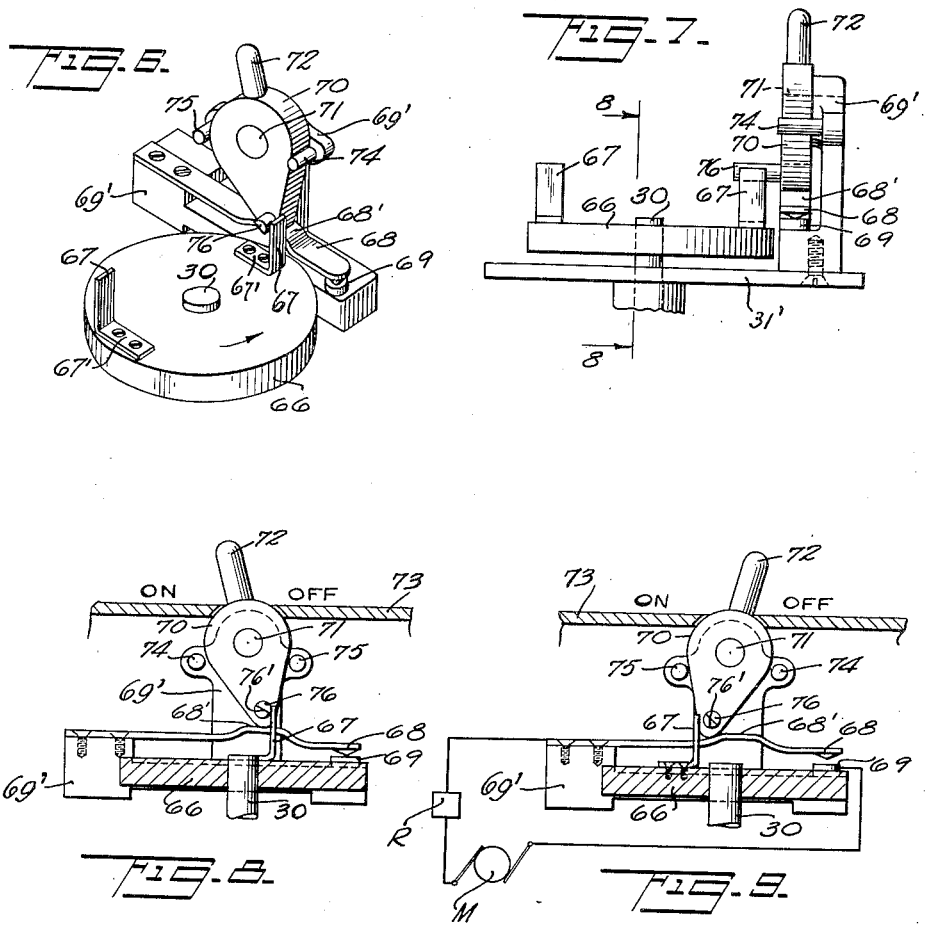

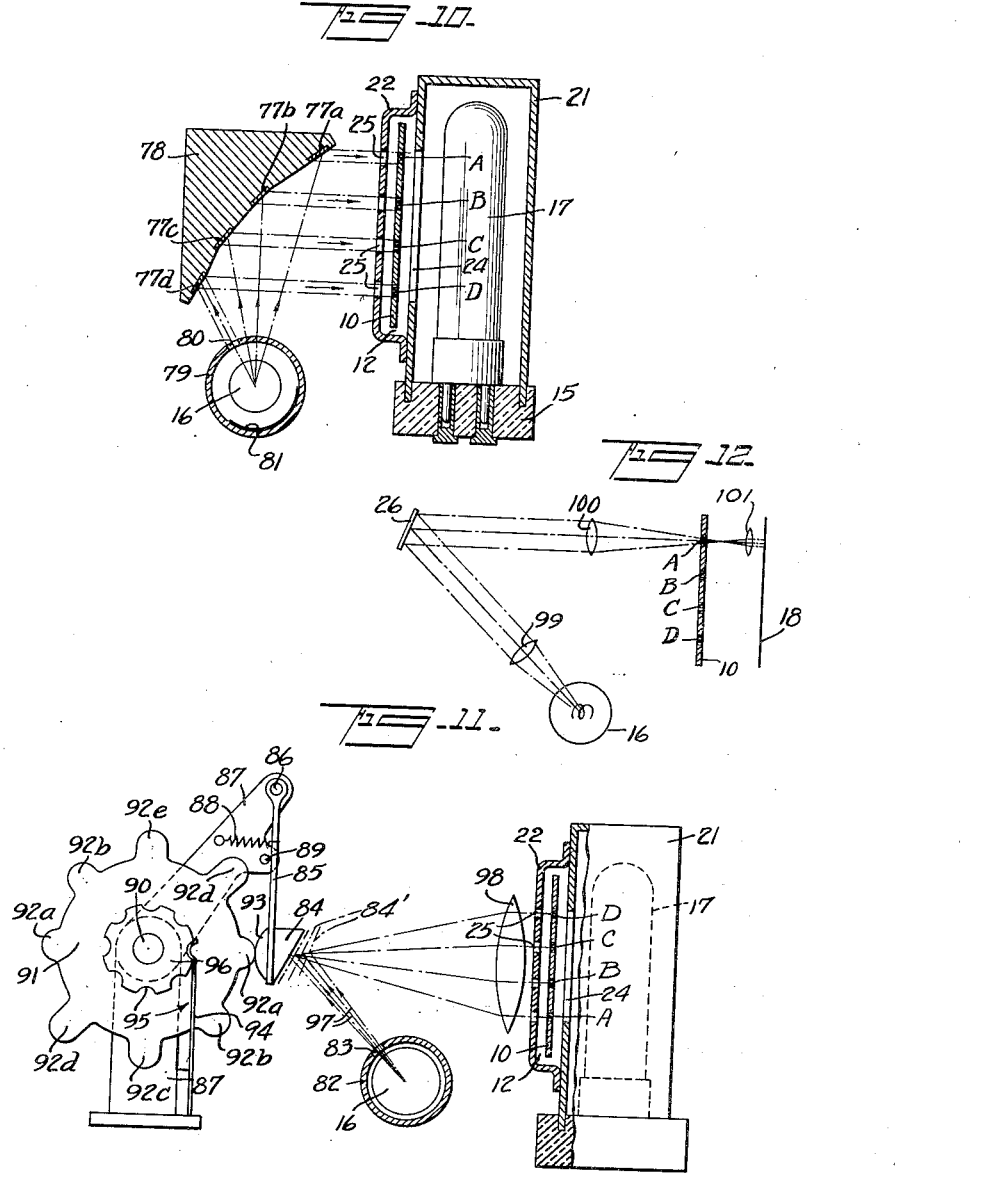

Patented Feb. 2, 1937

2,069,632

UNITED STATES PATENT OFFICE 2,069,632

OPTICAL SOUND-REPRODUCING APPARATUS

Adolph A. Thomas, New York, N. Y., assignor to Radio Corporation of America, New York, N. Y., a corporation of Delaware Application March 3, 1931, Serial No. 519,789

27 Claims. (Cl. 179—100.3)

My invention relates to the art of reproducing sound from record tracks made on a photographic film, and its object is to provide improved means for automatically shifting the light from one sound track to the next at the proper moment.

It has been heretofore proposed to record sound on a film in a plurality of parallel tracks running in alternately opposite directions, so that the odd-numbered tracks are played when the film runs forwardly, and the other tracks are played during the reverse movement of the film. Since only one track can play at a time, it is necessary to confine the optical field of the film to the operative track, and the light must be shifted from one track to the next. In prior devices it has been attempted to shift the light beam either by moving the film transversely across the optical field or mounting the entire optical system on an adjustable support which is moved relatively to the film. Both constructions are objectionable as being too complicated, and also because of the difficulty in moving either the film or the optical system to successive positions that require extremely accurate adjustments.

I overcome the foregoing objections and disadvantages by providing mirror mechanism so constructed and arranged that the light from an electric lamp is reflected by a mirror to only one sound track at a time. When the end of a track is reached, the mirror mechanism is automatically adjusted to throw the light to the next sound track, so that substantially continuous playing of the tracks is obtained. The basic idea of my invention may be embodied in various ways. For example, I may use a series of mirrors mounted on a movable support and so arranged that only one mirror can be in operative relation to the film. Each mirror controls one sound track, and the support is automatically adjusted at the end of a track to bring the next mirror into operative position for the next track. In another form of my invention I employ a series of fixed mirrors, one for each sound track, and the light from an electric lamp is shifted from one mirror to the next. It is also possible to have only a single mirror angularly adjustable to reflect light through the desired sound track.

The novel features and practical advantages of my invention will be understood from a description of the accompanying drawings, in which—

Fig. 1 is an elevational (or plan) view of one form of my adjustable mirror mechanism arranged in operative relation to a sound film, certain parts being sectioned for clearness;

Fig. 2 is a transverse sectional view on line 2—2 of Fig. 1;

Fig. 3 shows an end portion of the sound film and certain circuits controlled by the film for operating the mirror support and film-reversing mechanism at the end of a sound track;

Fig. 4 is a face view of a portion of the sound film to show the other ends of the record tracks and the switches controlled by the film;

Fig. 5 represents a section on line 5—5 of Fig. 1;

Fig. 6 is a detached perspective view of switch mechanism adapted to be automatically opened at the end of the last sound track;

Fig. 7 is a side view of Fig. 6;

Fig. 8 represents a section on line 8—8 of Fig. 7, the switch parts being in closed position;

Fig. 9 is a view similar to Fig. 8 with the switch parts in open position;

Fig. 10 is a sectional view of a modification in which the mirrors are mounted in fixed angular relation to the film;

Fig. 11 shows another modification in which a single mirror is mounted on an adjustable arm to reflect the light to the proper sound track; and Fig. 12 is a simplified diagram showing a suitable lens system in the optical path between a source of light and the film-controlled photo cell.

Referring to Figs. 1–4, there is a sound film 10 which is movably supported in any practical way to pass through the optical field in chamber 12 at the proper speed. The sound film 10 carries a plurality of record tracks arranged side by side in close parallel relation and running in alternately opposite directions. In the present instance I have shown six sound tracks indicated by the letters A to F, but any other number of tracks may be recorded on the film, depending upon the available film width and also upon the width of the individual tracks. It is preferable to have an even number of tracks, so that after the playing of the last track, the film is wound back on the original pay-out reel, which may then be removed from the machine in the same condition as when it was inserted. We may assume that the three sound tracks A, C and E are played during the forward run of the film as indicated by arrow 13 in Fig. 3, and that the other tracks B, D and F are played during the reverse movement of the film in the direction of arrow 14 in Fig. 4. The supporting reels for the film may be arranged vertically as in movie projectors, or in a horizontal position over the top board of the cabinet in which the apparatus is housed. This will be understood without additional illustration.

A base plate 15 supports an electric lamp 16 and a photo cell 17, both of any practical construction. The electric lamp 16 is capable of emitting a sheet of light wide enough to take in all the tracks on film 10, and the photo cell 17 has a cathode 18 of sufficient length to receive light through any one of the sound tracks. This will be clear from Fig. 1. The electric lamp 16 is surrounded by a cylindrical light-proof shield 19, which has a longitudinal slot 20 for a purpose that will presently be explained. The photo cell 17 is enclosed in a light-proof housing 21, which is removably mounted on base plate 15. The optical chamber 12 through which the film 10 passes is formed by a shallow box or casing 22, which may be fixed on base plate 15 in any practical way, as by screws 23, or it may be attached to the housing 21 (see Figs. 10 and 11). The members 21 and 22 are provided with aligned slots 24 and 25, which permit the passage of a very narrow beam of light transversely across the sound tracks. In practice, the width of slots 24 and 25 is about a mil (that is, a thousandth of an inch), usually varying from half a mil to three or four mils. The aligned slots 24 and 25 may extend across the entire acoustic area of the film, or they may be divided into short sections arranged opposite the individual sound tracks. The latter arrangement assumes that the sound tracks are spaced apart an appreciable distance, but if they are made very close together, the controlling slots 24 and 25 are continuous. In Fig. 1, the outer slots 25 is shown in sections and the inner slot 24 is continuous, but this is merely by way of example. The moving film 10 is guided through the optical field chamber 12 in such a way that it remains securely in correct operative relation to the aligned controlling slots 24 and 25.

Since the sound tracks A—F on film 10 can only be played one at a time, it is necessary to confine the light of lamp 16 to a single track, and it is also important to shift the light automatically from one track to the next for a continuous playing of the film from the first to the last track. In the construction shown in Figs. 1–5, the light-shifting operations are accomplished by a set of mirrors 26 mounted on a rotary cylinder 27. The mirrors 26 are arranged on cylinder 27 in two sets of six each, and for convenience the individual mirrors of each set are distinguished by the suffix letters $a$ to $f$. These suffix letters correspond to the letters of sound tracks A—F on film 10 to indicate that mirror 26a is in line with track A, mirror 26b in line with track B, and so on for the other mirrors and tracks. As seen in Fig. 2, the twelve mirrors 26 are spaced radially equal distances apart, and Fig. 1 shows the axial or longitudinal displacement of the mirrors so as to bring each one in line with its associated sound track. It is not necessary to have two sets of mirrors on cylinder 27, but this duplicate arrangement reduces the angle through which the cylinder 27 must be rotated to bring the next mirror into operative position. The outer surface of cylinder 27 is dull black or otherwise treated to reflect no light from lamp 16.

The mirrors 26 are attached to cylinder 27 in any practical way. If the cylinder 27 is of cast metal or molded of composition material, the mirrors can be partially embedded in the outer wall of the cylinder during the casting or molding operation. It is also possible to mount the mirrors individually on cylinder 27, so that each mirror can be adjusted at the correct angle. The light-reflecting surfaces of mirrors 26 may be of any suitable character for reflecting light with maximum efficiency from lamp 16 to the cathode 18 of cell 17 through the aligned cells 24—25 and the interposed sound film 10. It is clear from Fig. 2 that only one mirror 26 can be in operative position at a time, so that light from lamp 16 can affect only one sound track during each run of the film. The path of light from lamp 16 through slot 20 to the operative mirror 26 is indicated diagrammatically by the dotted outline 28 in Fig. 2, and the dotted outline 29 is intended to represent the light reflected from the mirror through slot 25, film 10 and slot 24 to the light-sensitive cathode 18 of cell 17. In Fig. 1 the dotted parallel lines 29 indicate diagrammatically the light reflected by each mirror to the aligned sound track when that mirror is in operative position, which corresponds to the position of mirror 26a in Fig. 2.

The mirror-carrying cylinder 27 has a shaft 30 which is journalled at its ends in a suitable frame or bracket 31. It goes without saying that the base plate 15 and bracket 31 are supported in fixed relation in the cabinet containing the film-controlled phonographic mechanism. The shaft 30 has fixed thereon a ratchet wheel 32 which has twelve teeth corresponding exactly to the radial positions of the twelve mirrors 26 on cylinder 27. This, of course, assumes that there are six sound tracks on film 10, and it will be apparent that the number of teeth in ratchet wheel 32 depends upon the number of sound tracks recorded on the film. An arm or lever 33 loosely pivoted on shaft 30 carries at one end a pivoted pawl 34 arranged to engage the teeth of ratchet wheel 32. A suitable spring 35 holds the pawl 34 firmly in engagement with the teeth. The ratchet arm 33 is actuated by a solenoid comprising a coil 36 and a magnetic core or plunger 37 which is pivotally connected to one end of the arm. A contracting coil spring 38 normally holds the ratchet arm 33 against a fixed stop 39. The coil 36 may conveniently be attached to the lateral extension 31' of bracket 31 by a strap 36' or otherwise.

When the coil 36 is energized, the plunger 37 is drawn in and rocks the arm 33 until it strikes a second fixed stop 40. During this movement of arm 33 the pawl 34 turns the ratchet wheel 32 (and therefore the cylinder 27) through a predetermined angle to bring the next mirror 26 into operative relation to its associated sound track. The stops 39 and 40 are so spaced that the angular movement of cylinder 27 at each energization of coil 36 corresponds directly to the angular spacing of mirrors 26. In the example illustrated, each movement of cylinder 27 is through an arc of thirty degrees. When the coil 36 is deenergized, the tensioned coil spring 38 instantly retracts the ratchet arm 33 against stop 39, but there is no movement of cylinder 27 during the return swing of the ratchet arm. This is due to the fact that the pawl 34 rides idly over the ratchet wheel. The cylinder 27 is firmly held in operative position by the friction in the mounting of shaft 30, and I may also use one or two spring fingers 41 arranged to snap into recesses 42 of cylinder 27, and thereby hold the latter firmly in operative position. Even if there should be slight variations in the operative positions of the individual mirrors 26, such variations would be amply compensated for by the width of the light beam 29 reflected from the mirror through slot 25. This will be understood from Fig. 2.

The energizing of coil 36 at the proper moment is automatically controlled by the sound film itself. Referring to Figs. 3 and 4, it will be seen that the film 10 has a notch 43 in one edge and a second notch 44 in the other edge. These two notches are spaced the proper distance from the ends of the sound tracks, for a purpose that will presently become clear. At opposite sides of film 10 there are mounted two arms 45 and 46, which are pivoted at 47 to a suitable support 48. The free ends of arms 45 and 46 carry a pair of rollers 49 and 50, which are held pressed against the edges of the film by a contracting coil spring 51. The pressure of rollers 49 and 50 against the film is sufficiently light to prevent injury to the film. The pivoted arms 45 and 46 carry contact fingers 52 and 53 adapted to cooperate with fixed contacts 54 and 55 respectively.

Still referring to Fig. 3, there are two coils 56 and 57 joined at one side by a conductor 58, which is connected by wire 59 to one side of the solenoid coil 36. The other side of this coil is connected by wire 60 to one terminal of the battery 61 or other source of electric current, and a conductor 62 connects the other battery terminal to the stationary switch contact 55. The switch contact 54 is connected by wire 63 to one side of coil 56. A wire 64 connects coil 57 to the movable switch arm 53, and a wire 65 connects the movable contact arm 52 to the battery main 62. It is to be understood that the coils 56 and 57 are parts of an electromagnetic mechanism adapted to reverse the operation of the film-driving shaft when the end of a sound track is reached. It will not be necessary to show and describe the details of such reversing mechanism, because it does not by itself form part of this invention. Of course, in a complete commercial phonograph utilizing the light-shifting device of my invention, it will be necessary to have some practical form of film-reversing mechanism operated by the coils 56 and 57, and so I refer to my pending application Serial Number 398,675, filed October 10, 1929, where a suitable film-driving and reversing mechanism is fully disclosed.

As long as the rollers 49 and 50 ride along the straight edge of the sound film, both switches 52—54 and 53—55 are open, so that the coils 36, 56 and 57 are all out of circuit. Let us assume that the film is running in the direction of arrow 13 and that the end of the operative record track A, C or E has just been reached, as indicated in Fig. 3. The roller 49 snaps into notch 43 and closes the switch arm 52, whereby the coils 36 and 56 are energized simultaneously through the following circuit: Battery lead 62, wire 65, across the closed switch 52—54, wire 63, coil 56, wire 59, coil 36, and through conductor 60 back to the battery. The energizing of coil 36 rotates the cylinder 27 to bring the next mirror 26 into operative position, as previously explained. Coil 56 is energized to operate suitable mechanism for reversing the direction of the film-driving shaft, so that the film now runs the other way— that is, in the direction of arrow 14 in Fig. 4 to play the next sound track B, D or F, as the case may be.

When the end of the operative sound track B, D or F is reached during the reverse movement of the film, as indicated in Fig. 4, the roller 50 snaps into notch 44 and closes the switch arm 53. The circuit is now closed through coils 36 and 57 in series as follows: From battery lead 62 across the closed switch contacts 55 and 53, conductor 64, coil 57, wire 59, coil 36, and through conductor 60 back to the battery. The ratchet wheel 32 is again rotated to bring the next mirror 26 into operative position, and coil 57 actuates the reversing mechanism to change the direction of movement of film 10, so that the latter now runs again in the direction of arrow 13. These light-shifting and film-reversing operations take place automatically when the end of each record track is reached, so that the playing of the film is substantially continuous from the beginning of the first track to the end of the last track. When the coil 36 is energized at the end of track F, the cylinder 27 moves one of the mirrors 26a into operative position for the first track A of the next film. Therefore, when the played film is removed, the optical mechanism is in operative condition for the next film inserted in the machine.

I also provide means for automatically stopping the machine when the end of the last sound track F is reached, as shown in Figs. 6–9. For this purpose the outer end of shaft 30 carries a disk 66 which is provided with a pair of spring fingers 67 arranged 180 degrees apart. These spring fingers may be integral projections of small plates 67' secured to disk 66. If only one set of mirrors 26 is mounted on cylinder 27, but one spring finger 67 is needed. A main switch for closing and opening all electric circuits of the machine is represented by a movable spring finger 68 and a fixed contact 69, both of which are supported in any practical way near the disk 66. For convenience, the switch members 68—69 may be mounted on an insulating bracket 69' which is fastened to the extension 31' of the main supporting frame 31. The movable switch arm 68 is controlled by a cam 70 pivoted at 71 on bracket 69' and having a suitable finger piece 72 which projects through an opening in a panel 73 of the cabinet. This panel may be the top board of the machine or a vertical panel at the front, depending upon whether the reels that support the sound film are arranged horizontally or vertically. The switch arm 68 is formed with a hump or cam portion 68' adapted to be engaged by the pointed end of cam 70 to hold the switch closed when the finger piece 72 is in "on" position, as will be clear from Figs. 6 and 8. The open position of switch arm 68 is shown in Fig. 9, where the tip of cam 70 is to one side of hump 68'. The rocking movements of cam 70 are limited by the fixed stops 74 and 75. The natural tendency of spring arm 68 to move to open position holds the cam 70 firmly in either position against the stops.

The inner end of cam 70 is provided with a lateral pin or projection 76 arranged in the path of the two spring fingers 67 on disk 66. During the playing of the last sound track F, the cylinder 27 is in such position that one of the spring fingers 67 is near the cam pin 76, as shown in Fig. 8. When the end of track F is reached, the coil 36 is energized and the movement of shaft 30 carries the spring finger 67 past the cam pin 76 into the position shown in Fig. 9. During this movement of spring finger 67, the free end thereof engages the pin 76 and rocks the cam 70 to open position. Just before the spring finger 67 reaches the end of its movement, it snaps out of engagement with pin 76, so that the cam 70 can be moved to closed or "on" position by means of the finger piece 72. To facilitate the disengagement of finger 67 from pin 76, the latter may be cut away at 76' to form a bevelled surface which the tip of the finger leaves with a snap action before it reaches the position shown in Fig. 9. The spring fingers or lugs 67 are sufficiently stiff to move the cam 70 out of engagement with the hump 68' of switch arm 68, and at the same time the free end of each spring finger is sufficently yieldable to pull out of engagement with pin 76 before the ratchet arm 33 strikes the stop 49 (see Fig. 3). As previously stated, the switch 68—69 may be the main power switch of the machine for turning the electric current on and off, or it may be a switch in the circuit of the electric motor M that operates the film-driving mechanism R, as diagrammatically indicated in Fig. 9.

In the modification of Fig. 10, the sound film 10 has only four record tracks marked A to D, and the light from electric lamp 16 is reflected to these tracks by fixed mirrors 77, which are distinguished for the different sound tracks by suffix letters $a$ to $d$ respectively. That is to say, mirror 77$a$ reflects light to track A, mirror 77$b$ reflects light to track B, and so on for the other mirrors and tracks. The mirrors 77 are secured to a fixed support 78 of any suitable construction. The lamp 16 is surrounded by a rotary shield 79, whch is provided with a longitudinal slot 80 arranged to permit the passage of light to one mirror at a time. To concentrate the light through slot 80, the inner wall of shield 79 may carry a reflector 81. The electric lamp 16 is preferably stationary, but it may be also mounted to rotate with shield 79, which is automatically operated at the end of each record track in the same way as cylinder 27 of Fig. 1. In other words, the solenoid and ratchet drive for shaft 30 are supposed to be connected to the rotary shaft that carries the slotted shield 79. Otherwise, what has been said for the construction and operation of the embodiment shown in the preceding figures is applicable to the modification of Fig. 10.

In Fig. 11 the electric lamp 16 is surrounded by a stationary shield 82 which has a longitudinal slot 83 for directing a beam of light to a mirror 84 fixed on an angularly adjustable support 85. In the present instance, this support is in the form of an arm pivoted at 86 on a stationary bracket 87, and a contracting coil spring 88 normally holds the arm against a fixed stop 89. The bracket 87 supports a rotary shaft 90 which carries a disk or wheel 91 provided with two sets of cams 92. The different cams of each set are distinguished by the suffix letters $a$—$d$ to indicate that they control the reflection of light to the sound tracks A—D, respectively, on film 10. The arm 85 carries a rounded projection 93 arranged to be engaged by the cams 92. It may be assumed that the solenoid and ratchet mechanism shown in Figs. 1 and 3 for actuating the shaft 30 in a step-by-step movement is applicable to the operation of shaft 90. A spring finger 94 is arranged to snap into notches 95 of a disk 96 fixed on the rotary shaft 90 for the purpose of holding the cams 92 in correct engagement with the rounded projection 93 on the mirror arm 85. The stop 89 is so arranged that the arm 85 is out of contact with it when the projection 93 engages any one of the cams 92.

Since the film 10 in Fig. 11 has four record tracks, there are eight cams 92 on wheel 91, the corresponding cams in each set being identical. It will be observed that the four cams of each set project varying amounts from the periphery of disk 91 for the purpose of adjusting the mirror 84 to different angular positions. In other words, cam 92$a$ holds the mirror 84 in position to reflect light to sound track A, while the other three cams 92$b$—$c$—$d$ are so shaped as to adjust the mirror into positions for reflecting light to sound tracks B, C and D, respectively. The different positions of mirror 84 are indicated by dotted lines 84' in a rather exaggerated way. The slot 83 in shield 82 is sufficiently wide to permit the passage of light to mirror 84 in any one of its positions, as indicated diagrammatically by the dotted lines 97. The light reflected from mirror 84 passes through a lens or system of lenses 98 adapted to refract the light rays in a direction substantially at right angles to the plane of the film.

In all of the constructions above described, the intensity or quantity of light that strikes the cathode 18 of photo cell 17 is controlled by the character of the operative sound track. These light variations so affect the cathode 18 as to produce corresponding current impulses in an electric circuit adapted to operate or control a loudspeaker. This will be understood by those skilled in the art without the need of further illustration and description. Nor have I deemed it necessary to show a complete lens system for concentrating the light from lamp 16 on the mirrors and focusing the reflected light on the sound tracks and cathode 18. Such lens systems are well known in connection with sound films used in talking movies and other acoustic apparatus based on the photo-electric principle of recording and reproducing. It is sufficient that in Fig. 12 I have indicated diagrammatically a lens system 99 for concentrating the light of electric lamp 16 on mirror 26 (and this also applies to mirrors 77 and 84), and a second lens system 100 interposed between the mirrors and the film for proper focusing of the reflected light on the sound tracks. If necessary, a third lens system 101 may be placed between the film and the photo cell 17 to focus the light on the sensitive cathode 18. When I refer to the elements 26, 77 and 84 as mirrors, both in the description and claims, I include any practical means for reflecting the light rays from lamp 16 through the sound tracks to the photo cell 17. For example, instead of using plain mirrored surfaces, I may employ prisms and the like.

Although I have shown and described certain specific constructions, I want it understood that my invention is not limited to the details set forth. The basic principles of my invenion may undoubtedly be embodied in other structures than those shown in the drawings without departing from the scope of the appended claims.

I claim as my invention:

1. The combination of a sound film having a plurality of sound tracks and movable in an optical field, and light-reflecting mechanism for shifting the light laterally of the film, said mechanism including a pivoted optical member and means for turning said member through a plurality of different predetermined angles to reflect light through any sound track.

2. The combination of a source of light to produce an optical field, a photographic film movable in said optical field, a plurality of mirrors located wholly at one side of the film and adjustable for reflecting light to different longitudinal portions of the film, and operative means arranged at the other side of the film for receiving the light reflected by any one of said mirrors.

3. The combination of a source of light to provide an optical field, a movable film having a plurality of record tracks movable in said optical field, pivoted mirror means for reflecting light to only one track at a time, means for pivotally adjusting said mirror means to reflect the light successively from one track to the next, and a photo-electric device energized by the light reflected through any track.

4. The combination of a source of light for producing an optical field, a movable sound film having a plurality of record tracks movable in said optical field, a photo-electric cell affected by light passing through any one of said tracks, a corresponding plurality of mirrors for reflecting light to one track at a time, each mirror being operatively associated with a different one of said tracks, and adjustable means whereby only one mirror at a time receives light to be reflected to the corresponding record track, so that only one track is operative at a time.

5. The combination of a source of light for producing an optical field, a movable sound film having a plurality of record tracks movable in said optical field, a photo-electric cell affected by light passing through any one of said tracks, and an angularly adjustable mirror for reflecting light to one track at a time.

6. The combination of a source of light for producing an optical field, a movable sound film having a plurality of record tracks movable in said optical field, a photo-electric cell affected by light passing through any one of said tracks, a corresponding plurality of fixed mirrors for reflecting light to said tracks, and adjustable means for directing light to only one mirror at a time so that only one record track at a time is exposed to the optical field.

7. The combination of a movable sound film, mirror mechanism for reflecting light rays from a source of illumination to a plurality of record tracks on said film, said mirror mechanism including a pivoted optical member and means for turning said member through a plurality of different predetermined angles, each angle corresponding to one of the record tracks, whereby the light reflected by said mechanism affects only one track at a time, and photosensitive means controlled by the light passing through any one of said record tracks.

8. In optical acoustic apparatus, the combination of a source of light providing an optical field, a sound film movable in said optical field, a photo-electric device, mirror mechanism for reflecting light rays from a source of illumination to a plurality of record tracks on said film, said mechanism including a member pivotally adjustable with respect to said device, and film-controlled electric means for automatically operating said member at the end of a sound track to shift the reflected light from one track to the next.

9. The combination of a photographic film movable in an optical field, a pivoted support carrying a plurality of mirrors for reflecting light from a source of illumination to said film, each mirror being adapted to reflect light to a different portion of the film, and photo-electric means operatively associated with said film.

10. The combination of a movable sound film having a plurality of record tracks, a source of light providing an optical field for said record tracks, a photo-electric cell affected by the light passing through any one of said tracks, a pivoted support, light-reflecting means carried by said support for reflecting light rays to one track at a time and means for pivotally adjusting said support to reflect light successively from one track to the next.

11. In optical acoustic apparatus, the combination of a movable sound film having a plurality of record tracks, a source of light providing an optical field for said tracks, a photo-electric cell affected by the light passing through any one of said tracks, an adjustable support, light-reflecting means carried by said support for reflecting light rays from said source of illumination to said tracks, means for adjusting said support to reflect light to only one track at a time, a switch operated by said support when the end of the last track is reached, and means controlled by the operated switch for stopping the film.

12. The combination of a movable sound film having a plurality of record tracks, a source of light providing an optical field for said tracks, a photo-electric cell operatively associated with said tracks, a fixed support carrying a plurality of mirrors so positioned that each mirror reflects light from said source of illumination to one of said tracks, and adjustable means whereby only one mirror at a time reflects light to said film.

13. The combination of a movable sound film having a plurality of record tracks, a source of light providing an optical field for said tracks, a pivoted support, light-reflecting means carried by said support for reflecting light rays from said source of illumination to one track at a time, a photo-electric device energized by the light reflected through any one of said tracks, and means for automatically adjusting said support about its pivot at predetermined intervals to reflect light from one track to the next.

14. The combination of a movable sound film having a plurality of record tracks, a source of light providing an optical field for said tracks, a photo-electric cell operatively associated with said tracks, and a rotary cylinder carrying a plurality of spaced mirrors arranged to reflect light from said source of illumination to said tracks, each mirror reflecting light to a particular track only.

15. The combination of a movable sound film having a plurality of record tracks, a source of light providing an optical field for said tracks, a photo-electric cell operatively associated with said tracks, a rotary cylinder carrying a plurality of spaced mirrors arranged to reflect light from said source of illumination to said tracks, each mirror being positioned to reflect light to a particular track, and film-controlled means for actuating said cylinder at predetermined intervals to bring the next mirror into operative relation to its associated track.

16. The combination of a movable sound film having a plurality of record tracks, a source of light providing an optical field for said tracks, a photo-electric cell operatively associated with said tracks, an adjustable support carrying a mirror for reflecting light from said source of illumination to said tracks, said mirror being so arranged as to affect only one track at a time, and means for adjusting said support to vary the angular position of said mirror and thereby shift the reflected light from one track to another.

17. The combination of a movable sound film having a plurality of record tracks, a source of light providing an optical field for said tracks, a photo-electric cell operatively associated with said tracks, a pivoted arm carrying a mirror for reflecting light from said source of illumination to said tracks, said mirror being so arranged as to affect only one track at a time, and a rotary cam device for adjusting said support to vary the angular position of said mirror and thereby shift the reflected light from one track to another.

18. The combination of a movable sound film, a source of light providing an optical field for said film, mirror mechanism for reflecting light rays from said source of illumination to a plurality of record tracks on said film, said mirror mechanism including a pivoted optical member whereby the light reflected by said mechanism affects only one track at a time, photo-electric means operatively associated with said record tracks, and an actuating device controlled by the film itself for operating said pivoted member to shift the reflected light from one track to the next.

19. In optical sound-reproducing apparatus, the combination of a movable sound film having a plurality of record tracks, a source of light providing an optical field for said tracks, a photo-electric cell operatively associated with said tracks, an electric motor for operating said film, a hand switch for closing and opening the motor circuit, a movable member provided with means for directing rays of light to said sound tracks one at a time, means for operating said member when the end of a track is reached to shift the light to the next track, means for automatically establishing a mechanical connection between said member and said switch to open the latter when the end of the last track is reached, and means whereby the movement of said member to open said switch automatically returns said member to initial position for directing light to the first sound track of the film next to be played.

20. In optical sound-reproducing apparatus, the combination of a movable sound film having a plurality of record tracks, a source of light providing an optical field for said tracks, a photo-electric cell operatively associated with said tracks, an electric motor for operating said film, a switch for closing and opening the motor circuit, said switch including a hand-operable member, a rotary device provided with means for directing rays of light to said sound tracks one at a time, film-controlled means for automatically operating said device when the end of a track is reached to shift the light to the next track, means carried by said device for automatically engaging said member and actuating the same to open the switch when the end of the last track is reached, and means whereby the rotary movement of said device to open said switch automatically returns said device to initial position for directing light to the first sound track of the film next to be played.

21. Film apparatus comprising a film having a plurality of sound tracks longitudinally disposed thereon, a source of light, means for defining said light into a beam substantially the width of one of said sound tracks, photo-electric means operatively associated with said tracks, and adjustable means for reflecting said beam of light through a selected one of said sound tracks, said reflecting means including a plurality of mirrors all located at one side of the film.

22. A film apparatus comprising a plurality of film sound tracks, a source of light providing an optical field for said tracks, a photosensitive cell, and reflective means movable with respect to said photocell for directing light from a selected one of said sound tracks to said cell, said reflecting means including a pivoted member adapted to be turned through a plurality of different predetermined angles to reflect light to any sound track.

23. In a sound-on-film reproducing apparatus employing a photographic film having a plurality of sound records arranged longitudinally thereon, an optical system mounted for axial swinging movements and for projecting a light beam image upon one of said records at a time, and means for swinging the said system to cause it to scan selectively one record at a time.

24. In a sound-on-film reproducing apparatus as claimed in claim 23 wherein the means for moving the optical system includes the film and means associated with the film and controlled thereby.

25. In a sound-on-film reproducing apparatus, the combination of a film having a plurality of longitudinally disposed and parallel sound tracks thereon, an axially swingable optical system disposed to project a light beam image upon one sound track at a time, means for moving and halting the optical system to scan one track at a time, and means for automatically causing the film to move past the optical system successively in opposite directions.

26. In a sound-on-film reproducing apparatus as claimed in claim 25, in which the optical system is automatically swung in one direction and halted so that the light image therefrom is projected successively upon the respective sound tracks.

27. In a sound-on-film reproducing apparatus as claimed in claim 25, in which automatically controlled step-by-step mechanism is provided for causing the optical system to swing and scan one sound track at a time.

ADOLPH A. THOMAS.